United States Patent [19]

Nomura et al.

[11] Patent Number: 5,393,131
[45] Date of Patent: Feb. 28, 1995

[54] HYDRAULIC BRAKE SYSTEM WITH ENHANCED BRAKING FORCE FOR REAR WHEELS

[75] Inventors: Yoshihisa Nomura; Michiharu Nishii, both of Toyota, Japan

[73] Assignee: Aisin Seiki Kabushiki Kaisha, Kariya, Japan

[21] Appl. No.: 114,171

[22] Filed: Sep. 1, 1993

[30] Foreign Application Priority Data

Sep. 4, 1992 [JP] Japan ................... 4-262884

[51] Int. Cl.⁶ .............................................. B60T 8/32
[52] U.S. Cl. ....................... 303/100; 188/358; 188/349; 303/9.62; 303/9.75; 303/113.3; 303/92; 303/119.1; 303/114.1
[58] Field of Search ............... 303/92, 100, 113.3, 303/113.2, 114.1, 119.1, 13, 14, 113.5, 113.4, 114.2, 116.1, 9.62, 6.01, 9.75, 9.63, 111; 188/358, 359, 349

[56] References Cited

U.S. PATENT DOCUMENTS

| | | | |
|---|---|---|---|
| 4,848,853 | 7/1989 | Mizuno et al. | 188/358 |
| 4,874,207 | 10/1989 | Nishii et al. | 188/358 |
| 4,940,290 | 7/1990 | Nishii et al. | 303/2 |
| 4,986,613 | 1/1991 | Nishii et al. | 188/358 |
| 5,024,492 | 6/1991 | Nishii et al. | 303/92 |
| 5,054,860 | 10/1991 | Nomura et al. | 303/92 |
| 5,221,125 | 6/1993 | Okochi et al. | 303/92 |

FOREIGN PATENT DOCUMENTS 0082916  7/1983  European Pat. Off. ......... 303/113.3
64-47659 2/1989 Japan.

*Primary Examiner*—Douglas C. Butler
*Attorney, Agent, or Firm*—Burns, Doane, Swecker & Mathis

[57] ABSTRACT

A hydraulic brake system operates so that under anti-lock control, the braking forces for the rear wheels are enhanced in order to reduce braking loads for the front wheels. Further, upon the occurrence of a malfunction of the anti-locking control, the hydraulic pressure which is supplied to the front and the rear wheels is equalized in order to prevent the rear wheels from locking. In preferred embodiments, a small hydraulic pressure is supplied from a master cylinder to the front wheels while a large pressure is supplied from a brake booster to the rear wheels. Due to the large fluid pressure, the braking forces of the rear wheels are enhanced so that the rear wheels might tend to lock easily. However, anti-lock control can be performed effectively in order to avoid the rear wheels from locking. Upon the malfunction of the anti-lock control, a switching valve is operated so that the brake pressure which is supplied to the front and the rear wheels is equalized. The switching valve operates so that the braking forces of the rear wheels are mutually reduced in comparison to the braking forces of the front wheels. Therefore, it is also possible to prevent the rear wheels from locking if the anti-lock control fails. Thus, the vehicle stability is maintained even if the anti-lock control fails.

7 Claims, 4 Drawing Sheets

HYDRAULIC BRAKE SYSTEM WITH ENHANCED BRAKING FORCE FOR REAR WHEELS

BACKGROUND OF THE INVENTION

1. Field of the Invention

This invention relates to a brake system, particularly a hydraulic brake system with enhanced braking force for the rear wheels.

2. Description of the Prior Art

A conventional hydraulic brake system includes hydraulic lines, a brake booster for amplifying a depression force applied to a brake pedal and a master cylinder for converting an output from the brake booster to hydraulic pressure so that the vehicle is decelerated in accordance with the depression force applied to the brake pedal. Two hydraulic lines are usually utilized for almost all vehicles in order to transmit the hydraulic pressures from the master cylinder to the wheel cylinders. A tandem master cylinder is a known device for supplying pressure to the two hydraulic lines. Further, a vacuum booster and a hydraulic booster can be employed for amplifying the depression force applied to the brake pedal.

Japanese Laid-Open Patent Publication No. 64(1989)-47659 discloses a hydraulic brake system having a hydraulic brake booster. The hydraulic brake booster includes a modulator valve for modulating hydraulic pressure supplied from a pressure source and for supplying the modulated pressure to one of the two lines.

In this conventional hydraulic brake system, sufficient braking force can be obtained if the pressure source fails. When the booster fails due to a lack of pressure from the pressure source, both front and rear wheel cylinders are connected to the master cylinder so that sufficient hydraulic pressure is supplied to all of the wheel cylinders from the master cylinder.

Further, it is well known in the art that an anti-lock control apparatus can be adapted to the hydraulic brake system. Under anti-lock control, slip or skid of each wheel can be effectively reduced so that braking safety is increased.

In the conventional hydraulic brake system, however, the braking forces of the rear wheels are designed to be smaller than the braking forces of the front wheels because the load on the front wheels is generally heavier than on the rear wheels and deceleration of the vehicle reduces the load on the rear wheels. As a result, the brake pads associated with the front wheels are worn out in a short period.

SUMMARY OF THE INVENTION

Accordingly, one of the objects of this invention is to overcome the disadvantages of prior art brake systems without compromising braking safety.

Further, it is an objection of this invention to enhance the braking forces applied to the rear wheels.

Furthermore, one of the objects of this invention is to extend the life of the brake pads associated with the front wheels.

To achieve the above objects in addition to others, the hydraulic brake system of the present invention comprises a brake pedal for controlling brake pressure, anti-lock control means for controlling the brake pressure to avoid or prevent the rear wheels from locking, judging means for detecting a malfunction of the anti-lock control means, front braking means for braking the front wheels, rear braking means for braking the rear wheels, large pressure generating means for generating a large pressure in proportion to an operation of the brake pedal, small pressure generating means for generating a small pressure in proportion to the operation of the brake pedal, supply means for supplying the large pressure to the rear braking means and for supplying the small pressure to the front wheels, and switching means for equalizing the pressure supplied to the front braking means and the rear braking means by choosing one of the large and small pressures when the judging means detects the malfunction.

In the present invention, the small pressure is usually supplied to the front wheels and the large pressure is usually supplied to the rear wheels. The braking forces applied to the rear wheels are enhanced as a result of the large pressure and consequently the rear wheels might tend to lock easily. However, the anti-lock control can be performed effectively in order to avoid or prevent the rear wheels from locking. Therefore, braking loads for the front wheels are effectively reduced, thereby maximizing the use of the braking forces of the rear wheels.

Upon the malfunction of the anti-lock control, a switching means chooses one of the large and small pressures so as to equalize the pressures of the front and rear wheels. To equalize the pressures, the braking forces of the rear wheels are mutually reduced in comparison to the braking forces of the front wheels. Therefore, it is also possible to avoid or prevent the rear wheels from locking if the anti-lock control fails. Thus, the vehicle stability is maintained even if the anti-locking control fails.

BRIEF DESCRIPTION OF THE DRAWING FIGURES

Further details of the present invention will become apparent from the description that follows considered in conjunction with the drawing figures in which like elements bear like reference numerals and wherein.

DETAILED DESCRIPTION OF THE PREFERRED EMBODIMENT

Figure 2:
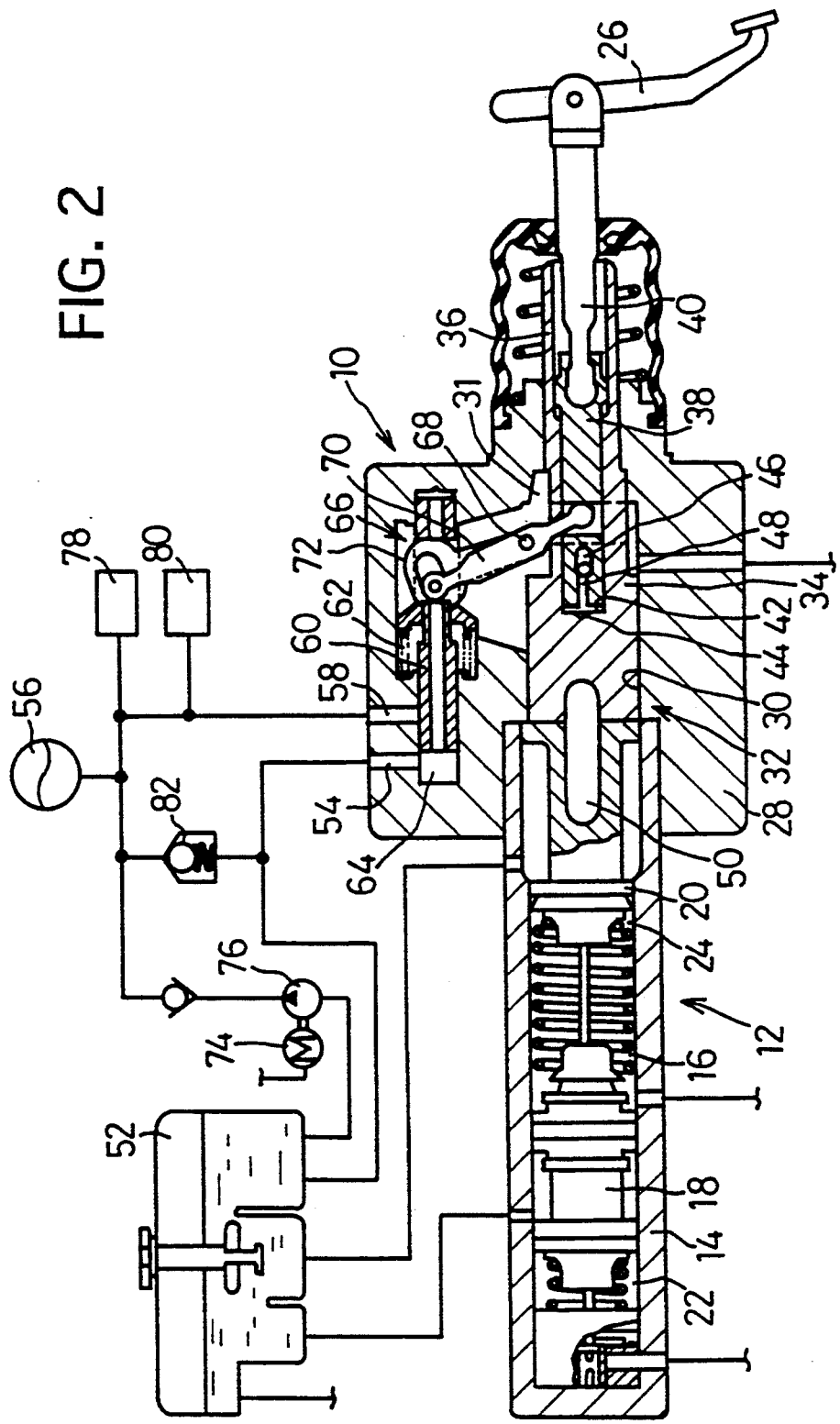
FIG. 2 is a cross-sectional view of a hydraulic booster and a master cylinder of the present invention.

With reference initially to FIG. 2, a hydraulic booster 10 is illustrated as being fixed to a tandem brake master cylinder 12. A cylinder bore 16 is formed in a cylinder housing 14 of the master cylinder 12. A first piston 18 and a second piston 20 are slidably disposed in a fluid tight manner in the cylinder bore 16. A first chamber 22 is formed between a bottom of the bore 16 and the first piston 18, while a second chamber 24 is formed between the first piston 18 and the second piston 20. Each of the chambers 22, 24 generates a pressure in proportion to a depression force of a brake pedal 26.

A booster housing 28 of the hydraulic booster 10 is fixed to the cylinder housing 14. A cylinder cavity 30 and a booster chamber 31 are formed in the booster housing 28. The cavity 30 communicates with the cylinder bore 16. A large diameter portion 34 of a booster piston 32 is slidably positioned in a fluid tight manner in the cavity 30. A hollow small diameter portion 36 of the booster piston 32 extends coaxially from the large diameter portion 34 of the booster piston 32. The small diameter portion 36 extends through the housing 28 toward the brake pedal 26, and is slidably disposed in the housing 28 in a fluid tight manner. A reaction piston 38 is slidably disposed in a fluid tight manner within the small diameter portion 36 of the booster piston 32.

One end of the reaction piston 38 is connected to an input rod 40 which is connected to the brake pedal 26. The input rod 40 is supported coaxially with respect to the booster piston 32. The other end of the reaction piston 38 is inserted into a hollow portion 42 which is formed in the large diameter portion 34 of the booster piston 32. A reaction chamber 44 is formed between a bottom of the hollow portion 42 and the reaction piston 38. The reaction chamber 44 communicates with the booster pressure chamber 31 through halls 46 and a fluid passage 48 so that the booster pressure is introduced from the booster pressure chamber 31 into the reaction chamber 44. An output from the booster 10 is transmitted from the booster piston 32 to the first and the second pistons 18 and 20 through an intermediate rod 50. The booster pressure is generated in the reaction chamber 44 and is transmitted from the reaction chamber 44 to the brake pedal 26 as a reaction force.

The booster housing 28 has a low pressure port 54 which is connected to a reservoir 52 and a high pressure port 58 which is connected to an accumulator 56. A spool 60 is disposed in a fluid passage 64 and is biased toward the fight as seen with reference to FIG. 2 (i.e., toward the brake pedal 26) by a spring 62. At the position shown in FIG. 2, the spool 60 disconnects the booster pressure chamber 31 from the high pressure port 58 and connects the booster pressure chamber 31 to the low pressure port 54 through a fluid passage 64. When the spool valve 60 moves to the left as seen in FIG. 2 (i.e., toward the low pressure port 54), the low pressure port 54 is closed and the high pressure port 58 is connected to the fluid passage 64. Thus, a booster pressure is increased in the pressure chamber 31 so that the booster piston 32 is moved to the left side in FIG. 2.

The spool 60 is linked to the booster piston 32 and the reaction piston 38 by a link mechanism 66. The spool 60 is driven by mutual movement of the reaction piston 38 with respect to the booster piston 32. The link mechanism 66 comprises a first link 70 and a second link 72 which are pivotally supported by a pin. The first and second links 70 and 72 constitute a motion conversion mechanism which is substantially the same mechanism as a conventional mechanism such as that described in Japanese Laid-Open Patent Publication No. 62-149547.

Brake fluid is supplied to the accumulator 56 from the reservoir 52 by a pump 76 which is driven by a motor 74. Power pressure is maintained in the accumulator 56 within a certain range by controlling the motor 74 based on a signal supplied from a pressure sensor 78. Further, an abnormal pressure decrease is detected by a pressure switch 80 which generates an alert signal for indicating an abnormal pressure decrease. An abnormal pressure increase is effectively prevented by a relief valve 82.

In this hydraulic brake system, both the pressure generated in the booster chamber 31 and the pressure generated in the master cylinder 12 are used for braking. Further, in this hydraulic brake system, anti-lock control is performed based on the booster pressure generated in the booster chamber 31.

Figure 3:
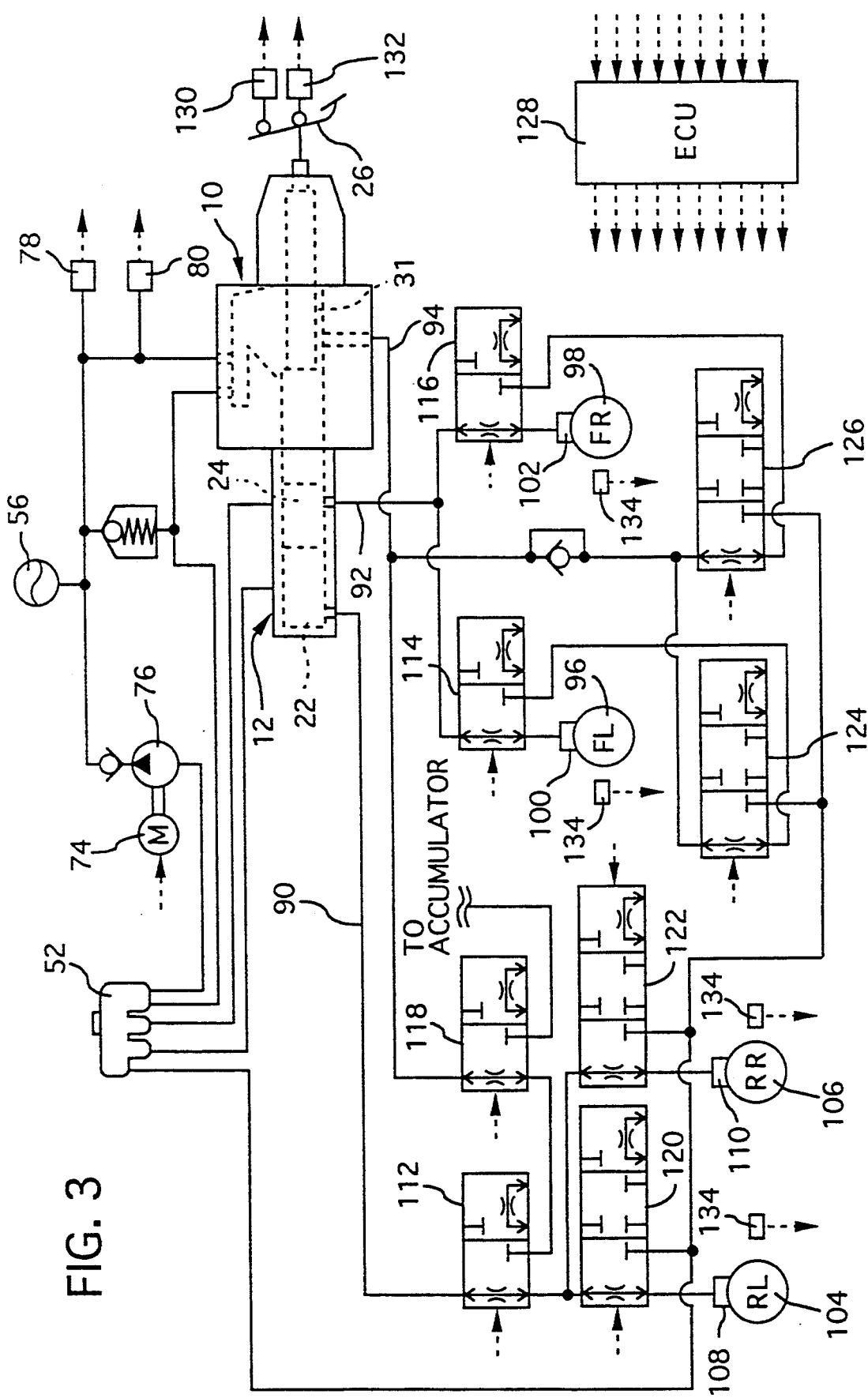
FIG. 3 is a block diagram which shows a hydraulic circuit of the present invention.

As shown in FIG. 3, the first and second chambers 22, 24 of the master cylinder 12 are connected to the wheel cylinders 100, 102, 108, 110 by hydraulic lines 90, 92, 94. Two of the wheel cylinders 100, 102 form parts of the brakes for the right and left front wheels while the other two wheel cylinders 108, 110 form parts of the brakes for the right and left rear wheels.

To perform the anti-lock control, solenoid flow switching valves 112, 114, 116 are positioned in the hydraulic lines 90, 92, 94. The solenoid valve 112 is interconnected among the first pressure chamber 22, the booster pressure chamber 31, and the wheel cylinders 108, 110. The solenoid valve 112 normally connects the wheel cylinders 108, 110 to the first pressure chamber 22, and connects the wheel cylinders 108, 110 to the booster pressure chamber 31 when it is energized.

The solenoid valves 114, 116 are interconnected among the second pressure chamber 24, the booster pressure chamber 31, and the wheel cylinders 100, 102. The solenoid valves 114, 116 normally connect the wheel cylinders 100, 102 to the second pressure chamber 24, and connect the wheel cylinders 100, 102 to the booster pressure chamber 31 when they are energized.

Further, an additional solenoid valve 118 is interconnected among the booster pressure chamber 31, the accumulator 56 and the solenoid valve 112. The solenoid valve 118 normally connects the solenoid valve 112 to the booster pressure chamber 31, and connects the solenoid valve 112 to the accumulator 56 when it is energized.

In addition, several three-position switching valves 120, 122 are connected among solenoid valve 112 and rear wheel cylinders 108, 110 in order to modulate the brake pressure under the anti-lock control. Similarly, several three-position switching valves 124, 126 are connected between the booster pressure chamber 31 and the solenoid valves 114, 116. These three-position switching valves 120, 122, 124, 126 are also connected to the reservoir 52. The three-position switching valves 120, 122, 124, 126 can be located in three positions to achieve three states—an increasing state for increasing the brake pressures by connecting the wheel cylinders 100, 102, 108, 110 to the booster pressure chamber 31, a decreasing state for decreasing the brake pressures by connecting the wheel cylinders 100, 102, 108, 110 to the reservoir 52, and a maintaining state for maintaining the brake pressure by disconnecting the wheel cylinders 100, 102, 108, 110 from both the booster pressure chamber 31 and the reservoir 52.

In this embodiment, the booster pressure which is generated in the booster pressure chamber 31 is always larger than the master cylinder pressure which is generated in the first and the second pressure chambers 22, 24 of the master cylinder 12. Preferably, the booster pressure is about 1.2 or 1.3 times larger than the master cylinder pressure. The ratio between the two pressures is determined by the following formula:

$$SD1/(SD2+SD3-SD4)=R$$

wherein:

R is the ratio between the booster pressure and the master cylinder pressure;

SD1 is the cross-sectional area of the cylinder bore 16 of the master cylinder 12;

SD2 is the cross-sectional area of the larger diameter portion 34 of the booster piston 32;

SD3 is the cross-sectional area of the reaction piston 38; and

SD4 is the cross-sectional area of the small diameter portion 36 of the booster piston 32.

An ECU (Electronic Control Unit) 128 includes a micro-processor. The ECU 128 receives a signal supplied from a brake switch 130 for detecting an operation of the brake pedal 26, a signal supplied from a cruise control cancel switch 132 for detecting an operation of the brake pedal 26 and, signals supplied from wheel speed sensors 134 for detecting the rotational speed of each wheel. The ECU 128 switches the solenoid valves 112, 114, 116, 118 based on the supplied signals. Further, the ECU 128 calculates the wheel speeds, the decelerations of the wheels, a body speed and other factors based on the supplied signals. The ECU 128 switches the solenoid valves 120, 122, 124, 126 based on results of the calculation so that anti-lock control or traction control are performed. Further, the ECU 128 watches the anti-lock control apparatus and traction control apparatus in order to detect malfunctions of these apparatus. When a malfunction is detected, the ECU 128 switches the solenoid valve 112 so that safety braking is achieved. To effect such a control, a ROM contains the program or routine shown in FIG. 1. The ECU 128 repeatedly executes the routine shown in FIG. 1.

While the brake is not being operated, the brake pedal 26 is at a rest position. The booster piston 32, the reaction piston 38, the first pressure piston 18 and the second pressure piston 20 are also at the rest position (i.e., the fight most position in FIG. 2). Thus, no brake pressures are generated in the booster pressure chamber 31, the first pressure chamber 22 and the second pressure chamber 24. Further, the solenoid valves 112, 114, 116, 118 are de-energized so that the wheel cylinders 100, 102, 108, 110 are connected to the master cylinder 12.

When the brake pedal 26 is depressed, the depression force is transmitted to the link mechanism 66 through the reaction piston 38. The spool 60 is moved to the left from the position shown in FIG. 2 so that the power pressure is introduced to the booster pressure chamber 31. The power pressure moves the first and the second pressure pistons 18 and 20 toward the left as viewed in FIG. 2 (i.e., toward the bottom of the cylinder bore 16). Thus, brake pressures are generated in the first and the second pressure chambers 22 and 24. The booster pressure and the master cylinder pressure will be supplied to the wheel cylinders 100, 102, 108, 110 when the solenoid valves 112, 114, 116 and 118 are properly controlled by the ECU 128.

In this embodiment, the booster pressure which is generated in the booster pressure chamber 31 is larger than the master cylinder pressure generated in the master cylinder 12. The booster pressure is basically supplied to the wheel cylinders 108, 110 for the rear wheels 104, 106. Further, the master cylinder pressures which are generated in the first and the second pressure chambers 22, 24 are basically supplied to the wheel cylinders 100, 102 for the front wheels 96, 98. However, while anti-lock control is performed, the booster pressure is supplied to all of the wheel cylinders 100, 102, 108, 110.

Further, when the anti-lock control apparatus fails or when necessity otherwise requires, the master cylinder pressures are supplied to all of the wheel cylinders 100, 102, 108, 110.

Figure 1:
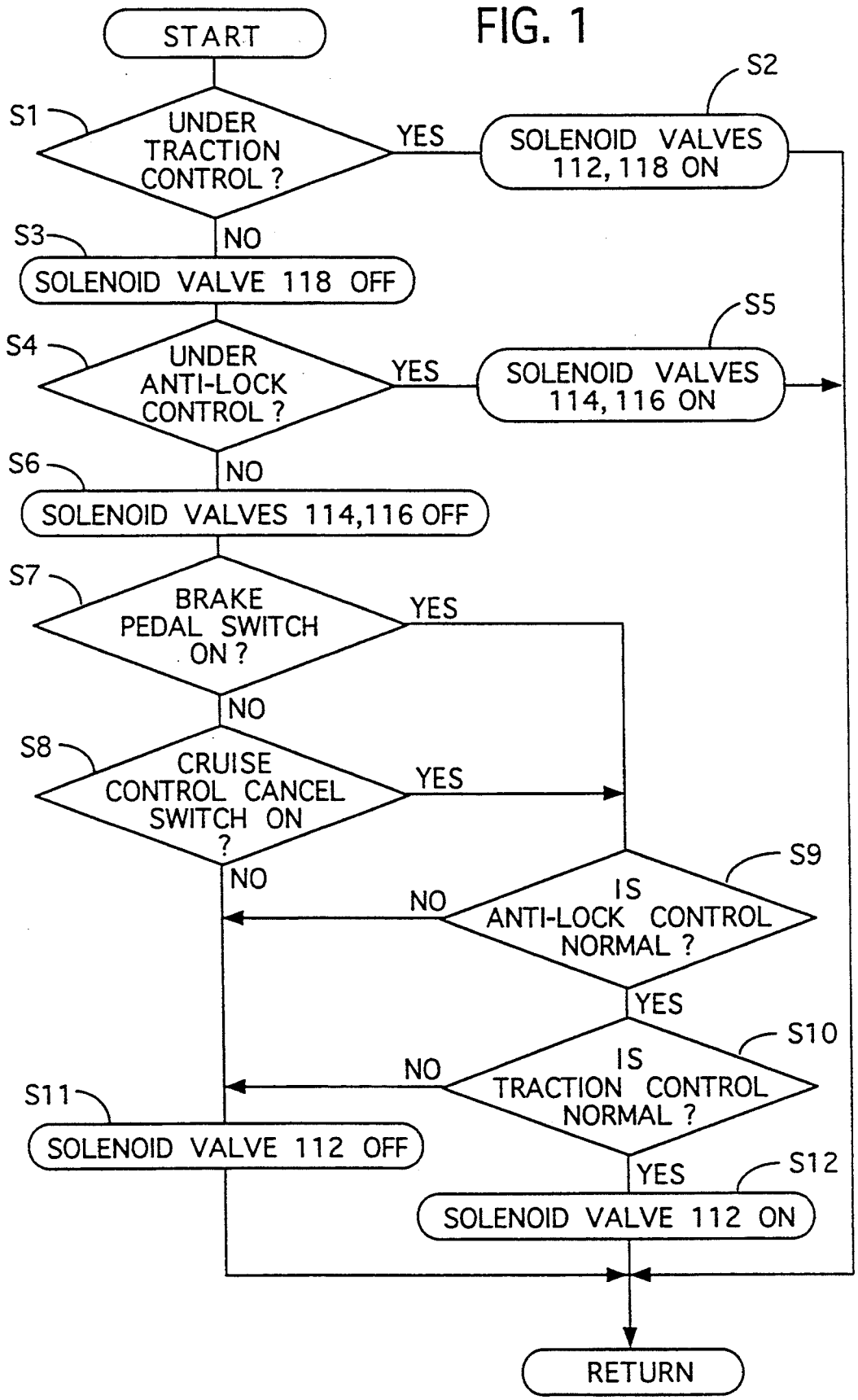
FIG. 1 is a flowchart which shows a valve switching program of the present invention.

Referring now to FIG. 1, an operation of the ECU 128 will be explained. The flowchart shown in FIG. 1 relates to a control for switching the solenoid valves 112, 114, 116, 118.

The ECU 128 monitors the conditions of the vehicle. In step 1, the ECU 128 judges whether or not the traction control is being performed. If the result of that judgment is "Yes", step 2 is executed so that the solenoid valves 112, 118 are energized and the routine is completed. Under this situation, the power pressure which is generated in the accumulator 56 is supplied to the wheel cylinders 108, 110. Thus the rear wheels 104, 106 are braked. If the result of the judgement in step 1 is "No", step 3 is executed so that the solenoid valve 118 is de-energized. The solenoid valve 112 will be de-energized at step 11 based on additional factors.

At step 4, the ECU 128 judges whether or not anti-lock control is currently being performed. The result of that judgement is always "No" before the brake pedal 26 is depressed. Thus, solenoid valves 114, 116 are de-energized at step 6. At step 7, the ECU 128 judges whether or not the vehicle is currently braking based on the signal which is supplied from the brake pedal switch 130. If the brake pedal switch 130 is turned on and the result of the judgement is "Yes", the next step, step 9, is executed. In contrast, if the result of the judgement in step 7 is "No", the next step, step 8, is executed. At step 8, the ECU 128 judges whether or not the cruise control is operating based on the signal which is supplied from the cruise control cancel switch 132. If the cruise control cancel switch 132 is turned on and the result of the judgement in step 8 is "Yes", the next step, step 9, is executed. On the other hand, if the result of the judgement in step 8 is "No", the solenoid valve 112 is de-energized at step 11. When step 11 is executed, all of the solenoid valves 112, 114, 116, 118 are de-energized. Therefore, all wheel cylinders 100, 102, 108, 110 are connected to the first and the second pressure chambers 22, 24 through the hydraulic lines 90, 92.

At step 9, the ECU 128 judges whether or not the anti-lock control apparatus is normal. The normal condition of the anti-lock control apparatus means that the functions of the microprocessor are normal and that the microprocessor can send proper signals to the respective peripherals. If the result of the judgement in step 9 is "Yes", step 10 is executed. However, if the result of the judgement in step 9 is "No", the solenoid valve 112 is deenergized at step 11.

At step 10, the ECU 128 judges whether or not the traction control apparatus is normal. The normal condition of the traction control apparatus means that the functions of the microprocessor are normal and that the microprocessor can send proper signals to the respective peripherals. If the result of the judgement in step 10 is "Yes", the solenoid valve 112 is energized at step 12. On the other hand, if the result of the judgement in step 10 is "No", the solenoid valve 112 is de-energized at step 11. When the solenoid valve 112 is energized at step 12, the booster pressure chamber 31 is connected to the wheel cylinders 108, 110 of the rear wheels 104, 106. Further, the second chamber 24 of the master cylinder 12 is connected to the wheel cylinders 100, 102 of the front wheel 96, 98.

During operation of the anti-lock control, the result of the judgement in step 4 is always "Yes". Then the next step, step 5, is executed so that the solenoid valves 114, 116 are energized. At this time, the booster pressure which is generated in the booster pressure chamber 31 is supplied to all of the wheel cylinders 100, 102, 108, 110 through the line 94. Further, the brake pressures are modulated by the solenoid valves 120, 122, 124, 126 which are controlled by a program (not shown) that is memorized in the ECU 128. At step 4, if the result of the judgement is "No", the solenoid valves 114, 116 are de-energized at step 6.

As described above, in this embodiment the brake pressures supplied to the rear wheel cylinders 108, 110 are usually established about 1.2 or 1.3 times larger than the brake pressures supplied to the front wheel cylinders 100, 102. Therefore, the braking force of the rear wheels 104, 106 is usually larger than the braking force of the front wheels 96, 98. However, in the event the anti-lock control apparatus fails, the master cylinder pressures are supplied to all of the wheel cylinders 100, 102, 108, 110 so that equal brake pressures are supplied to all of the wheel cylinders 100, 102, 108, 110.

Figure 4:
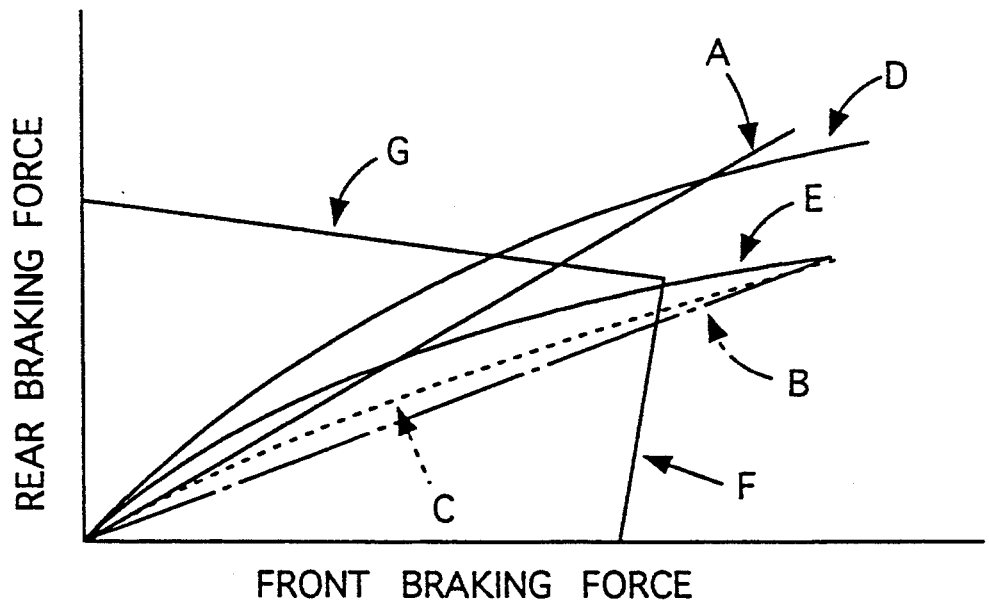
FIG. 4 is a graph which illustrates a braking force distribution between the front and rear wheels during a braking period of the present invention.

FIG. 4 illustrates a braking force distribution graph or chart. The solid line A represents a distribution line when the rear wheels 104, 106 are braked by the booster pressure. The one-dotted line B represents a distribution line when all of the wheels 100, 102, 104, 106 are braked by the master cylinder pressure. The broken line C represents a conventional distribution line for a vehicle having a conventional proportional valve. The curved line D is an ideal braking force distribution line under a full load. The curved line E represents an ideal braking force distribution line under a load of two passengers. These two ideal braking force distribution lines D, E show respective limits which make the front and the rear wheels lock at the same time under the respective loads. The solid line F shows a locking limit for the front wheels 96, 98 under the load of two passengers. The solid line G shows a locking limit for the rear wheels 104, 106 under the load of two passengers.

As clearly shown in FIG. 4, the distribution line C is established so that the rear braking force is always smaller than the distribution line E. If the distribution line C exceeds the distribution line E, the rear wheels tend to lock so that vehicle stability is deteriorated. In contrast, the distribution line A is always established larger than the distribution line C so that the rear wheels will generate larger braking forces than the ideal distribution line E. Thus, the rear wheels might be locked very easily in this embodiment. However, the anti-lock control apparatus will be operated in time so that the rear wheels are not locked and the vehicle conditions are maintained safely.

Figure 5:
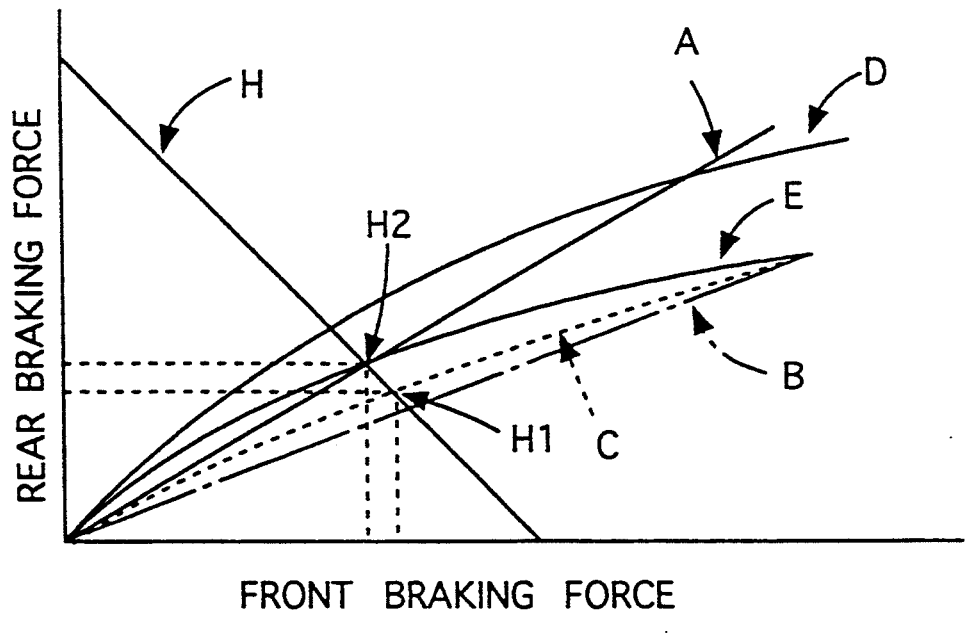
FIG. 5 is a graph which illustrates a braking force distribution between the front and rear wheels during an equally decelerated braking period of the present invention.

To enhance the braking forces of the rear wheels, the load on the front brakes, which is larger than the load on the rear wheels, is reduced. FIG. 5 is a graph or chart illustrating braking force distribution on an equal deceleration line H. The point H1 is the cross point between the distribution line C and the equal deceleration line H. Further, the point H2 is the cross point between the distribution line A and the equal deceleration line H. The braking forces of the front wheels at point H2 are always smaller than the braking forces of the front wheels at point HI. Therefore, to enhance the brake pressure for the rear wheels, the load on the front wheels can be reduced because the surplus braking ability of the rear wheels can be utilized more effectively on the high frictional road. Thus, the life of the brake pads for the front wheels can be extended and the fade phenomenon is not as likely to occur.

However, when the anti-lock control apparatus fails, the rear brakes tend to lock easily because of the enhanced braking forces and thus the vehicle stability might be deteriorated. Therefore, the solenoid valve 112 should be de-energized so that the brake pressure for the rear wheels is supplied from the master cylinder 12 as same as for the front wheels. After de-energizing the solenoid valve 112, the brake pressure in the rear wheels is the same as in the front wheels, which corresponds to the brake distribution line B in the FIG. 4.

In this embodiment, the conventional proportional valve can be removed and a simple structure is obtained by this invention. Further, in this invention the solenoid valve 112 is de-energized when the traction control apparatus fails. Thus, it works very effectively to prevent the incorrect traction control from performing because the accumulator pressure is not supplied to the wheel cylinders.

It is possible to modify the program so that substantially the same result is obtained. For example, the solenoid valve 112 can be energized when both the cruise control cancel switch 132 and the brake pedal switch 130 are turned on at the same time and when both the anti-lock control apparatus and the traction control apparatus are normal. Further, the cruise control apparatus is not required in this invention. In such a case, the solenoid valve 112 can be energized when the brake pedal switch 130 is turned on and when both the anti-lock control apparatus and the traction control apparatus are normal. The judgement of the occurrence of a malfunction for the anti-lock apparatus is not limited to the malfunction of the micro-processor.

In this embodiment, the booster pressure is established larger than the master cylinder pressure. However, such a feature is not required for this invention. That is, the master cylinder pressure can be greater than the booster pressure.

In this embodiment, whichever of the booster pressure and the master cylinder pressures is smaller is supplied to the wheel cylinders when the solenoid valve 112 is de-energized in order to equalize the pressures which are supplied to all of the wheel cylinders. However, whichever of the booster pressure and the master cylinder pressure is larger can be supplied to the wheel cylinders because the brake distribution line B is the same in both cases.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. Hydraulic brake system with enhanced braking force for rear wheels, comprising:
   a brake pedal for controlling brake pressure;
   anti-lock control means for controlling brake pressure to inhibit the rear wheels from locking;

judging means for detecting a malfunction of the anti-lock control means;

front braking means for braking front wheels;

rear braking means for braking the rear wheels;

large pressure generating means for generating a large pressure in proportion to an operation of the brake pedal;

small pressure generating means for generating a small pressure in proportion to the operation of the brake pedal;

supply means for supplying the large pressure to the rear braking means and for supplying the small pressure to the front braking means; and switching means for equalizing the brake pressure supplied to the front braking means and the rear braking means by choosing one of the large and small pressures when the judging means detects a malfunction of the anti-lock control means.

2. Hydraulic brake system according to claim 1 wherein said large pressure generating means includes a hydraulic booster and the small pressure generating means includes a tandem master cylinder.

3. Hydraulic brake system according to claim 1, including a plurality of solenoid valves disposed in said supply means for modulating brake pressure supplied to the front and rear braking means during operation of said anti-lock control means.

4. Hydraulic brake system according to claim 1, wherein said switching means is operatively associated with a solenoid valve disposed in the supply means so that upon detection of a malfunction by the judging means the solenoid valve is moved from a first position in which the rear braking means is in communication with the large pressure generating means to a second position in which the rear braking means is in communication with the small pressure generating means.

5. Hydraulic brake system according to claim 1, including traction-control means for controlling traction, said judging means detecting the occurrence of a malfunction of the traction-control means, said switching means equalizing the brake pressure supplied to the front and rear braking means when the judging means detects a malfunction in the traction-control means.

6. Hydraulic brake system used in a vehicle having front and rear wheels, comprising:

a brake pedal for controlling brake pressure;

anti-lock control means for controlling brake pressure to prevent the rear wheels from locking;

judging means for detecting a malfunction of the anti-lock control means;

a master cylinder operatively connected to the brake pedal for generating a first pressure upon operation of the brake pedal;

hydraulic booster means operatively associated with the brake pedal for generating a second pressure greater than said first pressure upon operation of the brake pedal;

supply means connecting said front and rear wheels to said master cylinder and said hydraulic booster means to supply brake pressure to the front and rear wheels;

valve means disposed in said supply means for directing brake pressure from the master cylinder and the hydraulic booster means to the front and rear wheels; and control means for controlling said valve means to direct the first brake pressure from the master cylinder to the front and rear wheels when the judging means detects a malfunction of the anti-lock control means.

7. Hydraulic brake system according to claim 6, wherein said valve means comprises a solenoid valve that is movable by the control means from one position in which the second pressure is supplied to the rear wheels to another position in which the first pressure is supplied to the rear wheels, said solenoid valve being moved to the another position when the judging means detects a malfunction in the anti-lock control means.

* * * * *